(12) United States Patent
Kim

(10) Patent No.: US 7,945,986 B2
(45) Date of Patent: May 24, 2011

(54) WIPER BLADE

(75) Inventor: In Kyu Kim, Gyeonggi-do (KR)

(73) Assignees: ADM21 Co., Ltd., Gyeonggi-do (KR); In-Kyu Kim, Gyeonggi-do (KR)

( * ) Notice: Subject to any disclaimer, the term of this patent is extended or adjusted under 35 U.S.C. 154(b) by 1210 days.

(21) Appl. No.: 11/565,527

(22) Filed: Nov. 30, 2006

(65) Prior Publication Data

US 2007/0180643 A1    Aug. 9, 2007

(30) Foreign Application Priority Data

Dec. 5, 2005    (KR) .................... 10-2005-0117621

(51) Int. Cl.
*B60S 1/38* (2006.01)
*B60S 1/40* (2006.01)

(52) U.S. Cl. ........... 15/250.201; 15/250.43; 15/250.451; 15/250.32; 15/250.48

(58) Field of Classification Search ............. 15/250.201, 15/250.43, 250.44, 250.361, 250.451–250.454, 15/250.48, 250.32
See application file for complete search history.

(56) References Cited

U.S. PATENT DOCUMENTS

| | | | | | |
|---|---|---|---|---|---|
| 3,035,298 | A | | 5/1962 | Scinta ................. | 15/250.42 |
| 3,060,480 | A | * | 10/1962 | Ziegler ................ | 15/250.452 |
| 3,114,926 | A | * | 12/1963 | Deibel ................ | 15/250.451 |
| 3,132,368 | A | | 5/1964 | Reese ................. | 15/250.42 |
| 3,141,186 | A | * | 7/1964 | Scinta ................. | 15/250.452 |
| 3,643,286 | A | * | 2/1972 | Wubbe ................ | 15/250.38 |
| 4,063,328 | A | * | 12/1977 | Arman ................ | 15/250.43 |
| 4,075,731 | A | | 2/1978 | Harbison et al. ...... | 15/250.42 |
| 4,336,625 | A | * | 6/1982 | Maiocco ............. | 15/250.451 |
| 4,343,063 | A | | 8/1982 | Batt ................... | 15/250.42 |
| 5,231,730 | A | * | 8/1993 | Schmid et al. ........ | 15/250.452 |
| 5,970,569 | A | * | 10/1999 | Merkel et al. ........ | 15/250.43 |
| D443,854 | S | | 6/2001 | De Block ............. | D12/219 |

(Continued)

FOREIGN PATENT DOCUMENTS

DE            19854372       *  5/2000

(Continued)

*Primary Examiner* — Gary K Graham
(74) *Attorney, Agent, or Firm* — Seed IP Law Group PLLC

(57) ABSTRACT

The present invention relates to a wiper blade mounted to a wiper apparatus for a vehicle to wipe a windshield and having an improved coupling structure of a connector for coupling a wiper frame to a wiper arm. An object of the present invention is to provide a wiper blade, which has a wiper frame formed to have elasticity, thereby being simple in structure, and has a connector, which is to be coupled with a wiper arm and is more accurately and securely coupled with the wiper frame. According to the present invention for achieving the above object, there is provided a wiper blade according to the present invention comprises a wiper strip in contact with the windshield, the wiper strip having a rail groove formed; a wiper frame having a coupling slit to be coupled with the rail groove and a coupling aperture formed in an end of the coupling slit, the wiper frame being curved along its lengthwise direction to provide an elastic force for bring the wiper strip into close contact with the windshield; and a connector to be coupled with the wiper frame and coupled to a wiper arm, wherein the wiper strip is arranged perpendicular to the windshield and coupled with the wiper frame to be inclined with respect thereto, and the connector has an inclined coupling structure for coupling the wiper frame to the wiper arm.

15 Claims, 9 Drawing Sheets

U.S. PATENT DOCUMENTS

| | | | |
|---|---|---|---|
| 6,266,843 B1 * | 7/2001 | Doman et al. | 15/250.201 |
| 6,279,191 B1 | 8/2001 | Kotlarski et al. | 15/250.201 |
| 6,799,348 B1 | 10/2004 | Swanepoel et al. | 15/250.32 |
| 6,810,556 B1 * | 11/2004 | Kotlarski | 15/250.43 |
| 6,836,926 B1 * | 1/2005 | De Block | 15/250.43 |
| 7,007,339 B2 | 3/2006 | Weiler et al. | 15/250.201 |
| D524,223 S | 7/2006 | Nakano et al. | D12/219 |
| 2006/0064840 A1 | 3/2006 | Park | 15/250.43 |
| 2006/0090281 A1 | 5/2006 | Park | 15/250.43 |
| 2006/0191093 A1 | 8/2006 | Boland et al. | 15/250.32 |
| 2007/0175017 A1 | 8/2007 | Kim | 29/557 |
| 2007/0180642 A1 | 8/2007 | Kim | 15/250.201 |

FOREIGN PATENT DOCUMENTS

| | | |
|---|---|---|
| DE | 10107021 A1 | 8/2002 |
| DE | 202004012132 U1 | 10/2004 |
| EP | 0436510 A2 | 1/1991 |
| EP | 1132267 * | 9/2001 |
| EP | 1757502 | 2/2007 |
| EP | 1792794 A2 | 6/2007 |
| EP | 1800977 A2 | 6/2007 |
| FR | 2804393 | 8/2001 |
| WO | 99/02382 | 1/1999 |
| WO | 99/11495 | 3/1999 |
| WO | 9912784 A1 | 3/1999 |
| WO | 9915384 A1 | 4/1999 |
| WO | 0037293 A1 | 6/2000 |
| WO | 01/02224 | 1/2001 |
| WO | 01/23232 | 4/2001 |
| WO | 02/04268 | 1/2002 |
| WO | 02/36397 | 5/2002 |

* cited by examiner (a)    (b)

(a)

(b)

(c)

(a)

(b)

(c)

WIPER BLADE

TECHNICAL FIELD

The present invention relates to a wiper blade mounted to a wiper apparatus for a vehicle to wipe a windshield, and more particularly, to a wiper blade having an improved coupling structure of a connector for coupling a wiper frame to a wiper arm.

PRIORITY INFORMATION

This application claims priority to Korean Patent Application No. 10-2005-0117621, filed Dec. 5, 2005, entitled WIPER BLADE, which application is incorporated herein by reference in its entirety.

BACKGROUND

FIG. 1 is a perspective view of a vehicle to which a conventional wiper blade is mounted, and FIG. 2 is a front view of the conventional wiper blade.

As shown in FIG. 1 and FIG. 2, the conventional wiper apparatus comprises a wiper arm 15 installed at one side of a vehicle body 10 and rotated from side to side by a wiper motor (not shown), and a wiper blade 20 mounted to the wiper arm 15, moved on and contacted with a windshield 12 to wipe it, and provided with a wiper strip 30.

The wiper blade 20 is coupled with the wiper arm 15 and is rotated within a predetermined angle range according to operation of the wiper motor. To this end, a main link 22 of the wiper blade 20 is coupled with the wiper arm 15. A plurality of intermediate links 24 are connected to the main link 22 through pins 25 for uniformly transmitting pressure of the wiper arm 15 to the main link 22. A plurality of sub links 26 are connected to the intermediate links 24 with pins 27 to connect the intermediate links 24 to the wiper strip 30. Also, clips 28 are formed at both ends of the sub link 26 and coupled with coupling grooves formed in the wiper strip 30.

Further, the wiper blade 20 is provided with a joint 29 to reduce a friction force between the main link 22 and the intermediate links 24.

In the wiper blade according to the prior art, however, a process of assembling a wiper strip as well as a structure for securing it are complicated, whereby there is a problem in that a time required for assembling the wiper blade is increased to lower a productivity of the articles. Also, in the conventional wiper blade, since the links are moved relative to each other when the wiper blade is operated, noises can be generated in the operation of the wiper blade. In addition, in the conventional wiper blade, the wiper blade is lifted up from the windshield by the wind when the vehicle is driven at a high speed, which causes a contacting force between the wiper blade and the windshield to be lowered. Accordingly, in order to solve the above problem, the structure in which an additional windbreak rib is provided on the main link has been proposed. However, a complete solution has not been proposed, so that there is a room for improvement of the wiper blade.

Technical Problem

The present invention is conceived to solve the aforementioned problems in the prior art. An object of the present invention is to provide a wiper blade, which has a wiper frame formed to have elasticity, thereby being simple in structure, and has a connector, which is to be coupled with a wiper arm and is more accurately and securely coupled with the wiper frame.

Technical Solution

According to the present invention for achieving the above object, there is provided a wiper blade according to the present invention comprises a wiper strip in contact with the windshield, the wiper strip having a rail groove formed; a wiper frame having a coupling slit to be coupled with the rail groove and a coupling aperture formed in an end of the coupling slit, the wiper frame being curved along? its lengthwise direction to provide an elastic force for bring the wiper strip into close contact with the windshield; and a connector to be coupled with the wiper frame and coupled to a wiper arm, wherein the wiper strip is arranged perpendicular to the windshield and coupled with the wiper frame to be inclined with respect thereto, and the connector has an inclined coupling structure for coupling the wiper frame to the wiper arm.

Here, a connecting rod is mounted to be inclined by causing the lengths of front and rear portions of a connecting rod portion to differ from each other, or a lower surface of the connector in contact with the wiper frame is formed to be inclined by causing the lengths of the front and rear portions of the assembling portion to differ from each other, so that the inclined coupling structure may be configured. In addition, the wiper frame may have an inclined portion formed in an end thereof in which the coupling aperture is formed, the coupling aperture being bent to be opened slantingly at a predetermined angle. In the meantime, the wiper strip may comprise a body portion, a coupling section formed on an upper end of the body portion and having a rail groove provided therein, and a strip portion formed in a lower end of the body portion to be brought into contact with the windshield, and the strip portion has a portion corresponding to the end inclined portion of the wiper frame removed. Further, the wiper frame may be formed with at least one coupling slit having a coupling aperture formed in one end thereof, and the wiper strip may be formed corresponding to the coupling slit. In addition, recesses may be formed in both sides of the coupling slit, and the wiper strip may also comprise protrusions positioned in the recesses when the wiper strip is coupled with the wiper frame. Also, the wiper frame may comprise a through portion formed in front and rear sides with respect to the coupling slit and connected with the coupling slit, and an arch-shaped rib formed over the through portion and connecting both the sides of the wiper frame. In addition, the wiper frame may comprise an auxiliary coupling slit connected with the coupling aperture and is formed collinearly with the coupling slit. Further, front and rear portions of the wiper frame with respect to the coupling slit may be symmetric in shape, or any one of the front and rear portions with respect to the coupling slit may be larger than the other one. Furthermore, the connector may be coupled to the wiper frame by any one of curling, riveting, welding or bonding with adhesive. A fixing protrusion may be formed on any one of the contact surfaces between the connector and the wiper frame, and a fixing hole corresponding to the fixing protrusion may be formed in the other one. The connector may have a lower surface curved with the same curvature as that of the wiper frame.

According to another embodiment of the present invention for achieving the above object, there is provided a wiper blade, comprising a wiper strip in contact with a windshield; a wiper frame coupled with the wiper strip and curved along its lengthwise direction to provide an elastic force for bring the wiper strip into close contact with the windshield; and a connector coupled with the wiper frame to be coupled to a wiper arm, wherein a spoiler is integrally formed on the wiper frame to be inclined at a predetermined angle.

The wiper frame may comprise a bending slit for bending the spoiler. Also, the wiper frame may comprise at least one or both of an upper spoiler formed on a rear surface of the wiper frame to be inclined upward and a lower spoiler formed on a front surface of the wiper frame to be inclined downward.

ADVANTAGEOUS EFFECTS

According to a wiper blade of the present invention configured as above, there are advantages in that a structure of a wiper frame for securing a wiper strip is simple, a process of assembling the wiper strip to the wiper frame is simple, a time required for the assembling process can be reduced, and the manufacturing costs can be remarkably reduced and the durability of the article can be significantly improved since the wiper frame is formed to have predetermined elasticity and therefore no additional part is necessary. There is also an advantage in that the wiper frame and the connector are securely coupled with each other, whereby the position change or rotation therebetween cannot occur.

EXPLANATION OF REFERENCE NUMERALS FOR MAJOR PORTIONS SHOWN IN DRAWINGS

| | | | |
|---|---|---|---|
| 50: | Wiper Blade | 60: | Wiper Strip |
| 62: | Body portion | 64: | Coupling Section |
| 65: | Rail Groove | 66: | Block Portion |
| 68: | Strip portion | 69: | Cut-out portion |
| 70: | Wiper Frame | 71: | Inclined portion |
| 73: | Protrusion | 74: | Coupling Aperture |
| 75: | Coupling Slit | 76: | Recess |
| 78: | Auxiliary Coupling Slit | 79: | Fixing Protrusion |
| 80: | Connector | 83: | Hanging Section |
| 83a: | Hanging Groove | 83b: | Bending Section |
| 86: | Connecting Rod | 89: | Fixing Groove |

DETAILED DESCRIPTION

Hereinafter, embodiments of the present invention will be described in more detail with reference to accompanying drawings.

Figure 3:
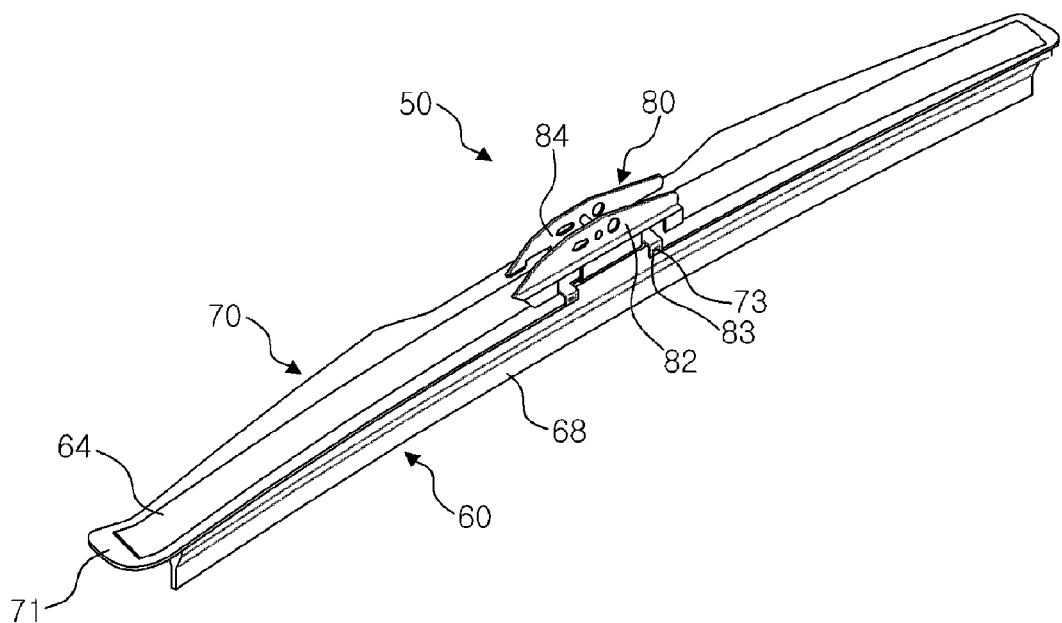
FIG. 3 is a perspective view of a wiper blade according to the present invention.
Figure 4:
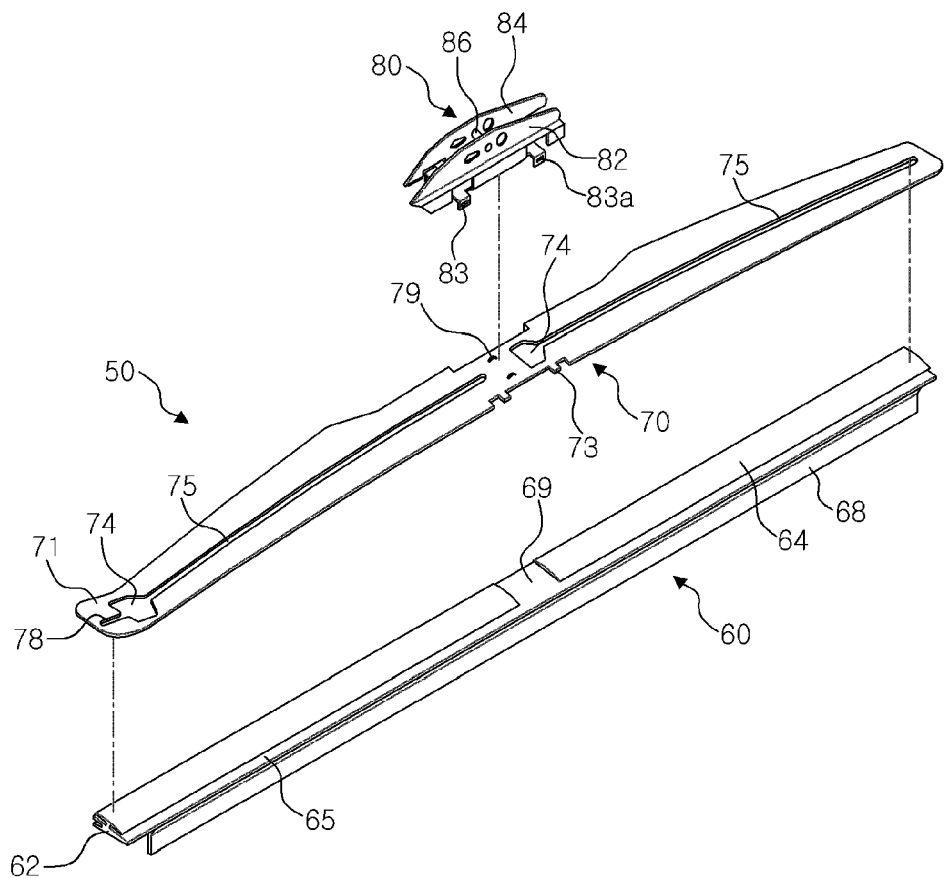
FIG. 4 is an exploded perspective view of the wiper blade according to the present invention.
Figure 5:
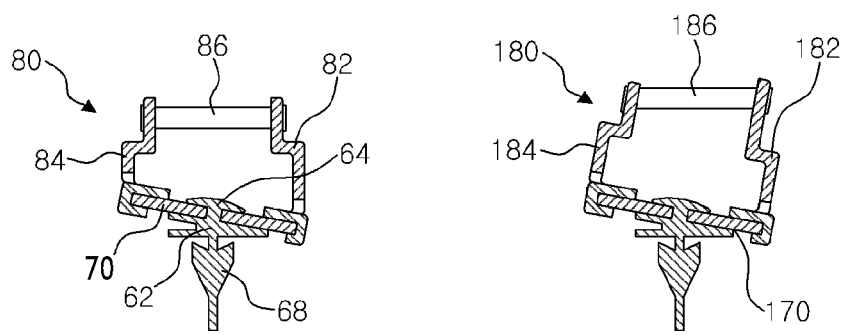
FIGS. 5 (a) and (b) are sectional views showing a coupling structure of a connector of the wiper blade according to the present invention.

FIG. 3 is a perspective view of a wiper blade according to the present invention, FIG. 4 is an exploded perspective view of the wiper blade according to the present invention, and FIGS. 5 (a) and (b) are sectional views showing a coupling structure of a connector of the wiper blade according to the present invention.

Figure 1:
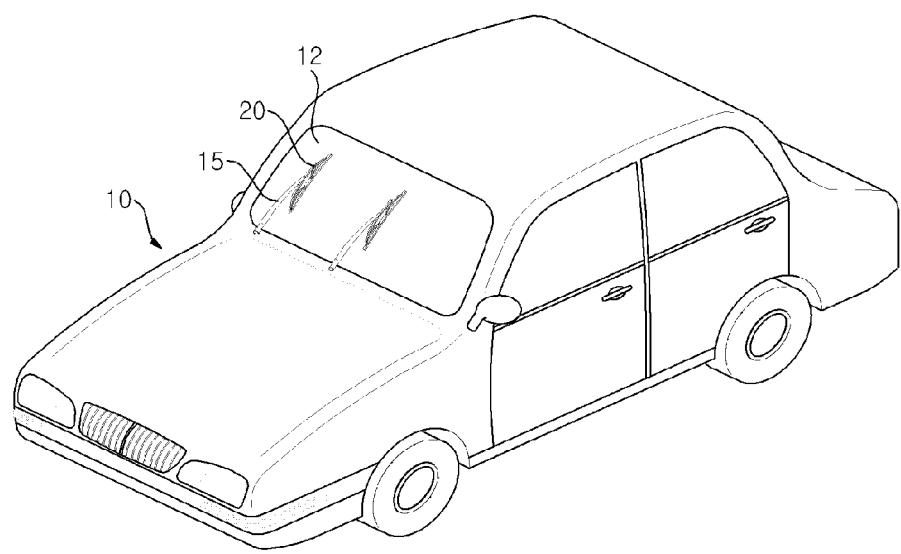
FIG. 1 is a perspective view of a vehicle to which a conventional wiper blade is mounted.
Figure 2:
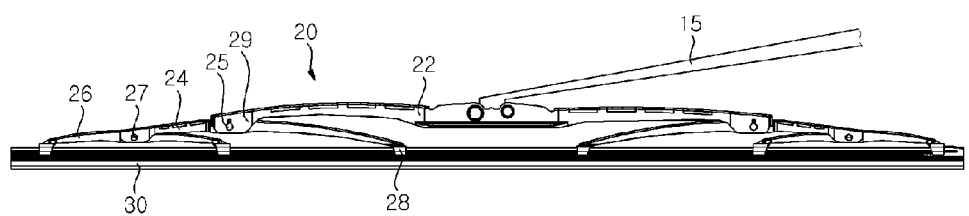
FIG. 2 is a front view of the conventional wiper blade.

As shown in FIG. 3 to 5, a wiper blade 50 according to the present invention comprises a wiper strip 60 brought into contact with a windshield and a wiper frame 70 coupled with the wiper strip 60. The wiper strip 60 is brought into close contact with the windshield to wipe out contaminants on the windshield. In the meantime, the wiper frame 70 has elasticity to bring the wiper strip 60 into close contact with the windshield. In the embodiment of the present invention, the wiper frame 70 is made of a thin metal sheet with a predetermined elasticity and is formed to be curved in along its lengthwise direction, to press the wiper strip 60. Also, in the wiper blade 50, a connector 80 is coupled with the wiper frame 70 so as to couple the wiper blade with a wiper arm 15 (FIG. 1) of a vehicle.

Firstly, the wiper strip 60 will be described. The wiper strip 60 is disposed perpendicularly to the windshield and coupled with the wiper frame 70 to be inclined. To this end, a coupling section 64 is formed on an upper end of a body portion 62 of the wiper strip 60. Also, the coupling section 64 is formed with rail grooves 65 to have both sides opened and to be coupled with the wiper frame 70. In addition, a strip portion 68 is formed in a lower end of the body portion 62 to be brought into perpendicular contact with the windshield and to wipe the windshield by the operation of the wiper arm. The coupling section 64 of the wiper strip 60 is formed to be inclined in one direction with respect to a moving direction of the wiper strip 60, so that the wiper frame 70 to be coupled with the rail grooves 65 is also formed to be inclined. Next, the wiper frame 70 will be described with reference to FIGS. 6 (a) to (c). Coupling slits 75 are formed in the wiper frame 70 to be coupled with the rail grooves 65 of the wiper strip 60. Each of the coupling slits 75 is formed to extend in the lengthwise direction and has a predetermined width such that the rail grooves 65 of the wiper strip 60 can be fitted therein. In order to maintain the rigidity of the wiper frame 70 and make it easy to couple the wiper strip 60 thereto, a plurality of coupling slits 75 may be intermittently and sequentially formed and disposed. The wiper strip 60 is formed such that the coupling section 64 corresponds to the coupling slits 75 of the wiper frame 70. That is, the coupling section 64 of the wiper strip 60 comprises a cut-out portion 69 formed by cutting out a portion corresponding to the portion in which the coupling slit 75 is not formed.

Figure 6:
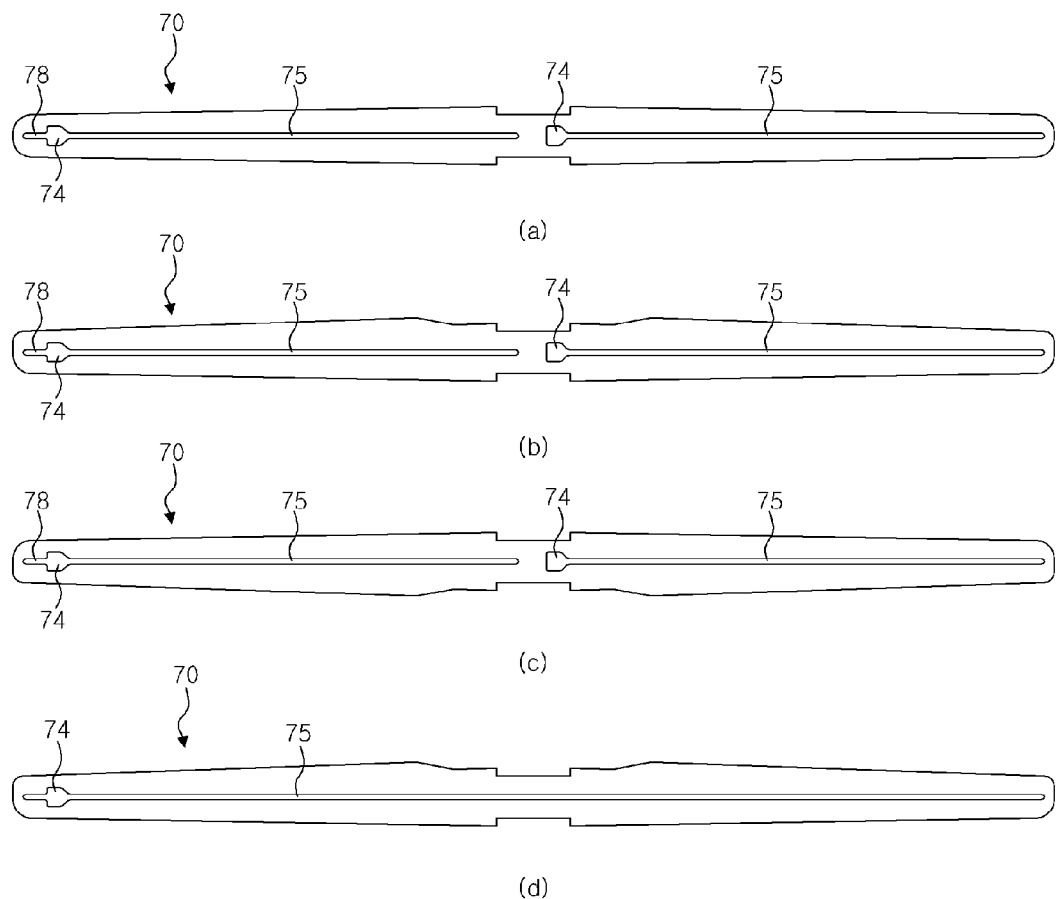
FIGS. 6 (a) to (d) are plane views showing a wiper frame of the wiper blade according to the present invention.

Although FIGS. 6 (a) to (c) show examples in which two coupling slits 75 are formed, one coupling slit 75 may be formed as shown in FIG. 6 (d). Also, in a case where the single coupling slit 75 is formed as described above, the wiper strip can be coupled with the coupling slit at one time by inserting the wiper strip into a coupling aperture 74 of the coupling slit 75 to fit the wiper strip into the coupling slit and then by sliding the wiper strip in one side.

Also, the coupling aperture 74, which can receive a portion of the coupling section 64 of the wiper strip 60, is formed in one end of the coupling slit 75 in order to insert the coupling section 64 of the wiper strip 60 thereinto. An end of the coupling aperture 74 connected to the coupling slit 75 is formed to be inclined in the fitting direction of the wiper strip 60, and thus the rail grooves 65 of the wiper strip 60 can be easily fitted to the coupling slit 75.

Also, an auxiliary coupling slit 78 is formed in the wiper frame 70 to be connected to the other end of the coupling aperture 74. The auxiliary coupling slit 78 is formed collinearly with the coupling slit 75 and fitted to the rail grooves 65 formed in the rear end of the wiper strip 60. To this end, the front end of the wiper strip 60 is fitted to the coupling slits 75 via the coupling aperture 74, and then, the front end of the wiper strip 60 is elastically deformed and inserted into the coupling aperture 74 by compressing the rear end of the wire strip 60. At this time, once the compression force exerted on the wiper strip 60 is removed, the rail grooves 65 formed at the rear end of the wiper strip 60 is fitted to the auxiliary coupling slit 78.

Figure 7:
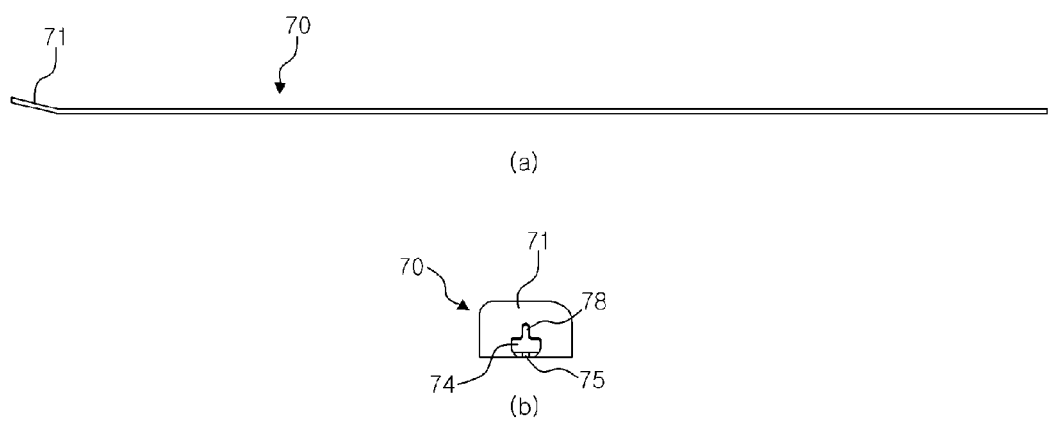
FIGS. 7 (a) and (b) are a front view and an enlarged sectional view showing that an inclined portion is formed in an end of the wiper frame according to the present invention, respectively.
Figure 8:
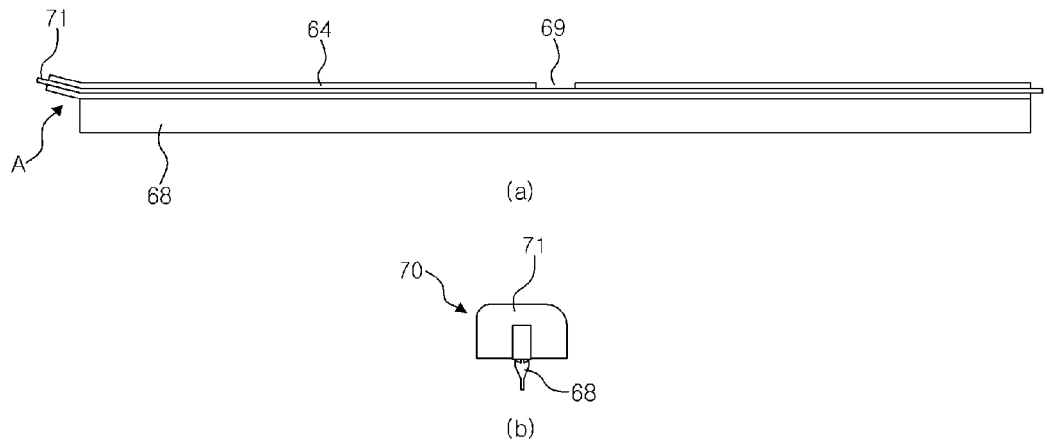
FIGS. 8 (a) and (b) are a front view and an enlarged sectional view showing that the wiper strip is coupled with the wiper frame according to the present invention shown in FIG. 7, respectively.

In the meantime, the wiper frame 70 may be formed with an inclined portion 71 at the end in which the coupling aperture 74 is formed, by bending the end in order for the coupling aperture 74 to be opened slantingly at a predetermined angle, as shown in FIGS. 7 (a) and (b). The most preferable inclination angle of the inclined portion 71 is in a range of 5 to 35 degrees, but is necessarily limited thereto. As described above, since the coupling aperture 74 is formed to be inclined, the coupling section 64 of the wiper strip 60 can be easily inserted into the coupling aperture 74 when the wiper strip 60 is assembled. At this time, in order to prevent the strip portion 68 from being bent when the wiper strip 60 is coupled to the wiper frame 70, a portion A corresponding to the inclined portion 71 is removed. A state where the wiper strip is coupled to the wiper frame 70 having the inclined portion 71 formed in the end thereof is shown in FIGS. 8 (a) and (b).

Figure 9:
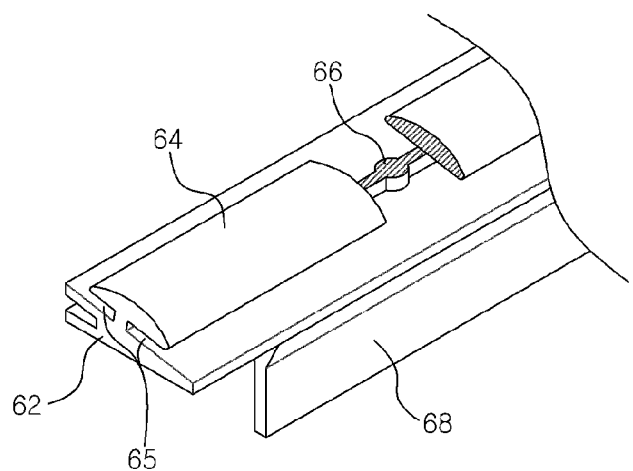
FIG. 9 is a perspective view for showing one example of the coupling slit of the wiper frame according to the present invention, wherein the wiper strip is partially cut away.

Also, as shown in FIG. 9, the wiper frame 70 may be formed with recesses 76 corresponding to each other on both sides of the coupling slit 75. The wiper strip 60 is formed with protrusions 66 which are placed in the recesses 76 when the wiper strip is coupled with the coupling slit 75. The wiper strip 60 and the protrusions 66 are made of a material having a predetermined elasticity. Accordingly, the protrusion 66 is compressed when the wiper strip is coupled with the coupling slit 75 and is restored when the protrusion is placed in the recesses 76, so that the coupling force between the wiper strip 60 and the wiper frame 70 is increased.

In the shape of the wiper frame 70, the front and rear portions of the wiper frame 70 with respect to the coupling slit 75 may be symmetric in width (see FIG. 6 (a)). Also, the wiper frame 70 may be formed such that the front portion of the wiper frame 70 with respect to the coupling slit 75 is larger than the rear portion (see FIG. 6 (b)). As described above, if the wiper frame 70 is formed to have a portion larger than the other portion, the wiper frame is more influenced by the wind when a vehicle is driven, and the wiper frame is pressed by the wind as the vehicle is driven at a high speed, so that the wiper frame 70 is brought into more close contact with the windshield. Also, the wiper frame 70 may be formed to have the rear portion with respect to the coupling slit 75 larger than the front portion, as shown in FIG. 6 (c).

Next, the connector 80 and an alternate connector 180 will be described with reference to FIGS. 5 (a) and (b). The connector 80, 180 has an inclined coupling structure for coupling the wiper frame 70, 170, which is arranged to be inclined with respect to the wiper strip 60, to the wiper arm. To this end, the connector 80, 180 includes a connecting rod portion in which a connecting rod 86, 186 connected to the wiper arm is located and an assembling portion which is assembled to the wiper frame 70, 170. Also, the inclined coupling structure as described above may be configured such that a lower surface of the connector in contact with the wiper frame is formed to be inclined by causing the lengths of the front and rear portions 82, 84 of the assembling portion to differ from each other as shown in FIG. 5 (a), or such that the connecting rod 186 is mounted to be inclined by causing the lengths of the front and rear portions 182, 184 of the connecting rod portion to differ from each other as shown in FIG. 5 (b).

Also, in order for the connector 80 to be easily coupled with the wiper frame 70, a coupling structure appropriate to a coupling method is provided in a lower portion of the connector 80.

Next, a method for coupling the connector 80 to the wiper frame 70 will be described with reference to FIGS. 10 (a) to (d).

As the method for coupling the connector 80 to the wiper frame 70, a variety of methods may be used, such as a method by curling, a securing method with rivets, or a bonding method with welding or adhesive. Examples of the methods are shown in FIGS. 10 (b) to (d). In addition, in order to couple the connector 80 to the wiper frame 70, two or more coupling methods can be used simultaneously.

Figure 10:
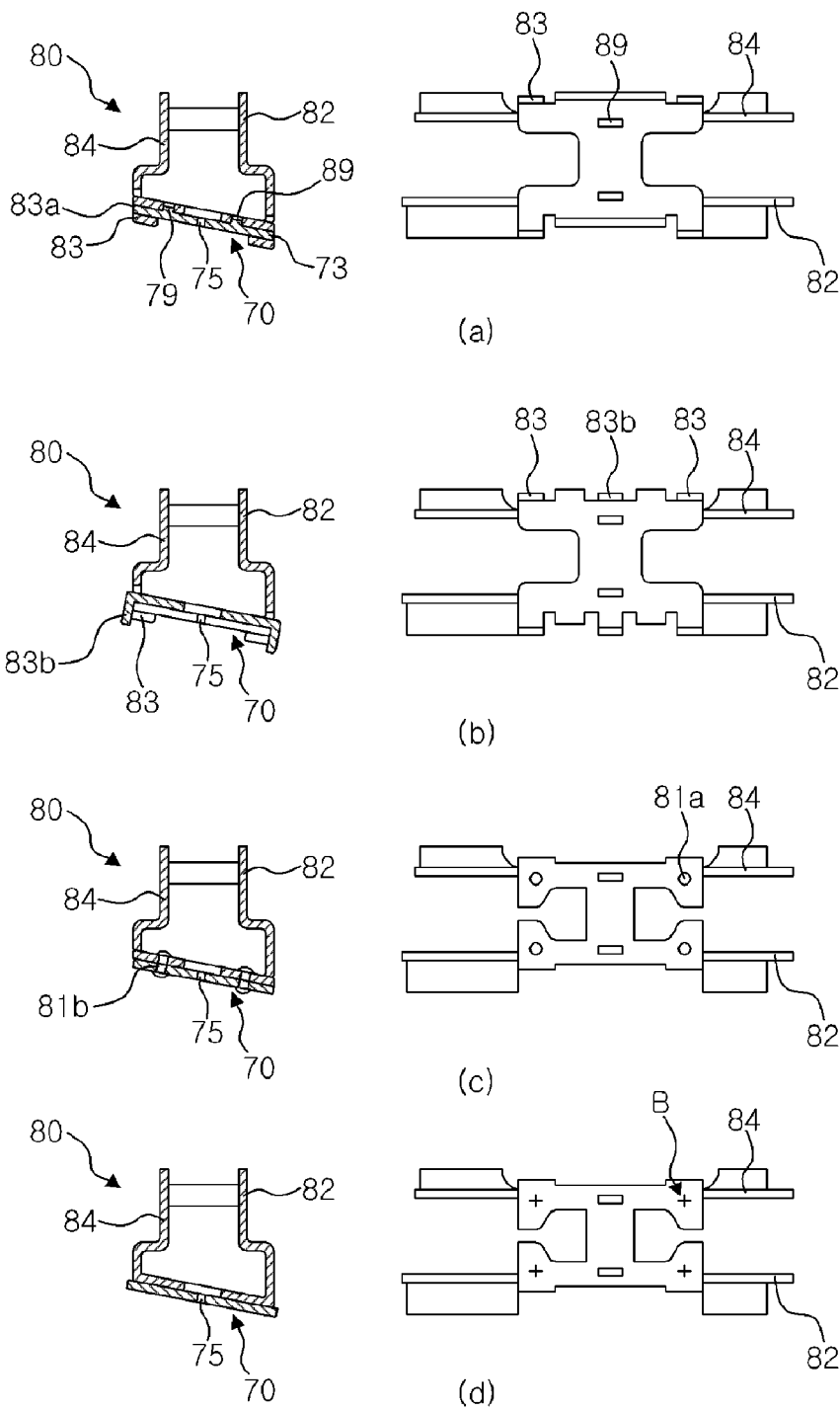
FIGS. 10 (a) to (d) are a sectional view and a bottom view illustrating a method for coupling the connector to the wiper frame of the wiper blade according to the present invention, respectively.

That is, FIG. 10 (b) shows the method for coupling the connector 80 to the wiper frame 70 in which there are provided four protrusions 83 extending from both ends of the lower portion of the connector 80 and the protrusions 83 are curled to enclose the wiper frame. In addition, as one of cases where the curling methods are used, protrusions are formed on both sides of the center of the lower portion of the connector 80, guides to which the wiper frame is fitted are respectively formed in both ends of the lower portion of the connector 80, and only the protrusions formed in both the sides of the center are curled, so that the connector 80 is combined with the wiper frame 70 and the guides formed in both the ends guide the wiper frame not to be shaken when and/or after the connector is coupled to the wiper frame. On the other hand, the protrusions for coupling the connector 80 to the wiper frame 70 may be formed on the wiper frame 70. FIG. 10 (c) shows an example in which the connector 80 is coupled to the wiper frame 70 with rivets, and FIG. 10 (d) shows an example in which the connector 80 is coupled to the wiper frame 70 by welding or adhesive.

Further, when using the methods for coupling the connector 80 to the wiper frame 70, a fixing protrusion may be further formed on any one of the contact surfaces between the connector 80 and the wiper frame 70 and a fixing hole coupled to the fixing protrusion may be further formed in the other of the contact surfaces. Referring to FIG. 10 (a), fixing protrusions 79 are formed on a surface of the wiper frame 40 in contact with the connector 70, and fixing holes 89 coupled with the fixing protrusions 79 are formed in a lower surface of the connector 80. Accordingly, when the connector 80 is coupled with the wiper frame 70, the fixing protrusions 79 are fitted into the fixing holes 89 in advance and their relative positions are fixed, so that their positions are prevented from being changed in the process of coupling the connector 80 to the wiper frame 70. That is, the fixing protrusions 79 and the fixing holes 89 shown in FIG. 10 (a) can be further applied to the coupling methods shown in FIGS. 10 (b) to (d). In addition, the coupling reliability can be more securely improved by welding the fixing protrusions 79 and the fixing holes 89 to each other. For example, the fixing holes 89 and the fixing protrusions 79 shown in FIG. 10 (a) are further applied when using the method for coupling the connector 80 to the wiper frame 70 with rivets as shown in FIG. 10 (c), the fixing holes 89 and the fixing protrusions 79 fitted in the fixing holes 89 are bonded to each other by a welding in addition to the riveting of the connector 80 and the wiper frame 70, so that the connector 80 and the wiper frame 70 can be more securely coupled with each other to prevent them from being shaken.

Although the fixing hole 89 is formed to be penetrated in the embodiment of the present invention, the fixing hole need not be penetrated but any hole to be coupled with the fixing protrusion 79 may be employed. Also, the fixing hole 89 and the fixing protrusion 79 may be formed in a variety of shapes such as a circle, a quadrangle and the like, and at least one or more of the fixing holes and the fixing protrusions can be formed. In addition, when the fixing hole 89 is formed in a rectangular shape or a plurality of fixing holes are provided, it is possible to prevent the connector 80 from being rotated.

Figure 14:
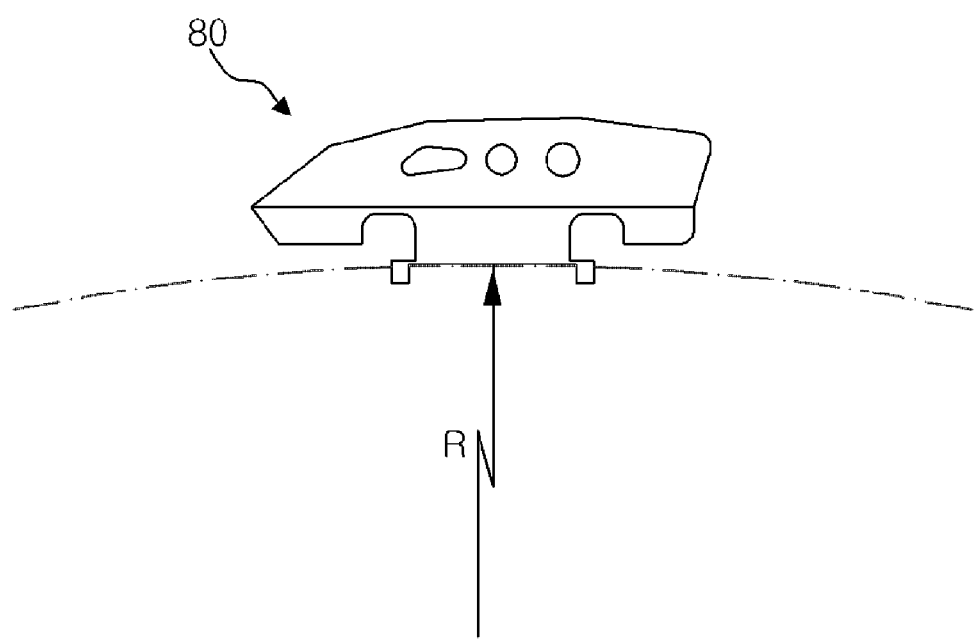
FIG. 14 is a front view of the connector of the wiper blade according to the present invention.

In addition, as shown in FIG. 14, a lower surface of the connector 80 may be curved with the same curvature as that of the wiper frame 70 in order to prevent a curvature of the wiper frame 70 from being changed when the connector is coupled with wiper frame. At this time, the curvature of the lower surface of the connector 80 is preferably in a range between 600 and 900R.

Next, another embodiment of the wiper frame 70 of the present invention will be described with reference to FIG. 11.

According to the other embodiment of the wiper frame 70 of the present invention, a reinforcement structure is applied in order to solve the problem that the strength of the wiper frame 270 is lowered, which can be caused by forming only one coupling slit 275.

Figure 11:
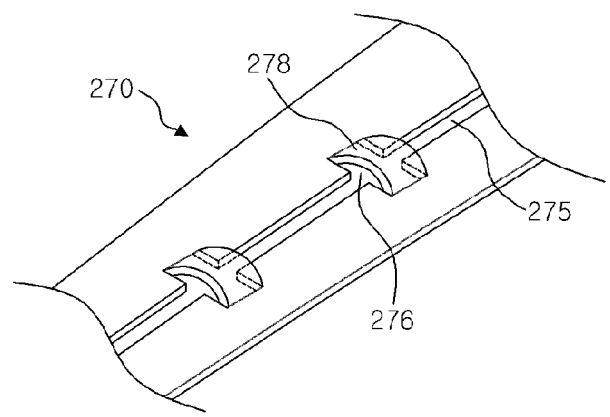
FIGS. 11 (a) to (c) are a plane view showing a wiper frame of another embodiment according to the present invention, a sectional view thereof, and a sectional view showing that a wiper strip is coupled with the wiper frame, respectively.
Figure 11:
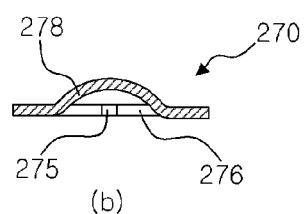
Figure 11:
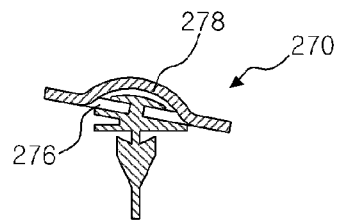

FIGS. 11 (a) to (c) are a plane view showing a wiper frame of the wiper frame of the other embodiment according to the present invention, a sectional view thereof, and a sectional view showing that a wiper strip is coupled with the wiper frame, respectively.

As shown in FIG. 11, at least one through portion 276 connected to a coupling slit 275 is formed in a wiper frame 270. Also, an arch-shaped rib 278 is formed on the front and rear sides of the wiper frame 270 with respect to the coupling slit 275 to span the coupling slit 275 and to connect both the sides of the wiper frame 270. A size of the through portion 276 corresponds to a width of the coupling section 64 of the wiper strip 60, so that the through portion does not interfere with the coupling section 64 when the wiper strip 60 is coupled.

Figure 12:
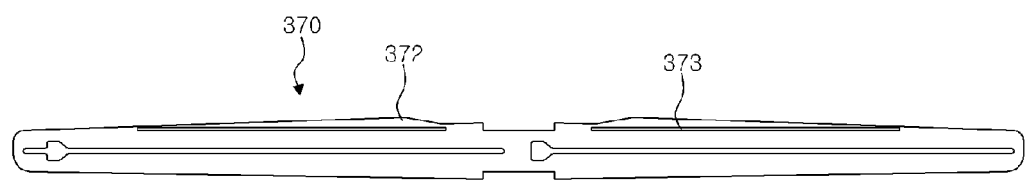
FIG. 12 is a plane view showing a wiper frame of a further embodiment according to the present invention.
Figure 13:
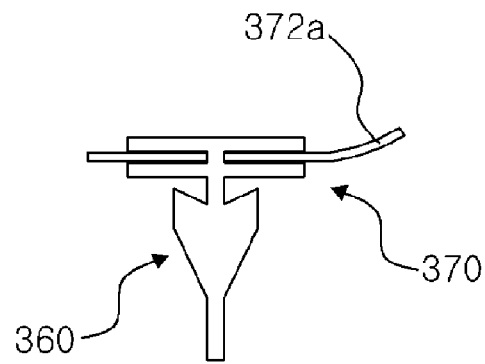
FIGS. 13 (a) to (c) are sectional views of FIG. 12 and its modifications showing that the wiper strip is coupled, respectively.
Figure 13:
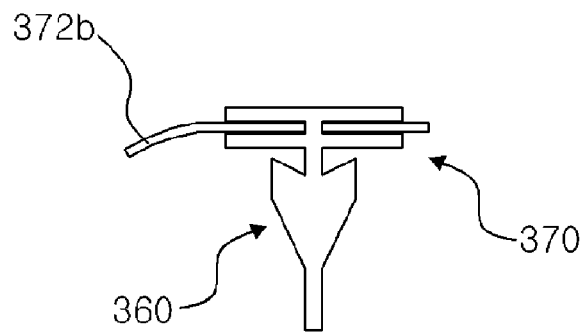
Figure 13:
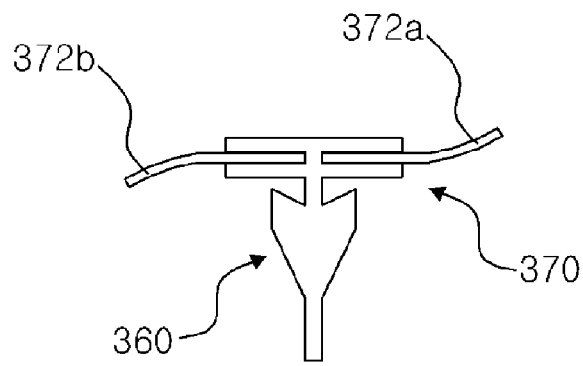

FIG. 12 is a plane view showing a wiper frame of a wiper blade of a further embodiment according to the present invention, and FIGS. 13 (a) to (c) are respectively sectional views of FIG. 12 and its modifications showing that the wiper strip is coupled.

As shown in FIGS. 12 and 13, the wiper blade according to the further embodiment of the present invention comprises brought into contact with a windshield, a wiper frame 370 coupled with the wiper strip 360 and curved along its lengthwise direction to provide an elastic force for bring the wiper strip 360 into close contact with the windshield, and a connector (not shown) coupled with the wiper frame to be coupled with the wiper arm. The technical configuration of the connector applied to the further embodiment of the present invention and the coupling method of the connector and the wiper frame are the same as those of the first embodiment of the present invention. In addition, a spoiler 372 is formed on the wiper frame 370 to increase an area exposed to wind. Further, the wiper frame 370 is formed with a bending slit 373 for bending the spoiler 372.

In the meantime, the spoiler 372 may be an upper spoiler 372a integrally formed on a rear surface of the wiper frame 70 as shown in FIG. 13 (a), or a lower spoiler 372b integrally formed on a front surface of the wiper frame 70 as shown in FIG. 13 (b). Alternatively, as shown in FIG. 13 (c), the upper and lower spoilers 372a and 372b may be integrally formed on a front and rear surfaces of the wiper frame 70.

The invention claimed is:

1. A wiper blade for wiping a windshield, comprising:
   a wiper strip having a body portion, a coupling section formed on an upper end of the body portion and having a rail groove provided therein, and a strip portion formed in a lower end of the body portion to be brought into contact with the windshield;
   a wiper frame having a coupling slit to be coupled with the rail groove of the wiper strip and a coupling aperture formed in an end of the coupling slit, the wiper frame being curved along its lengthwise direction to provide an elastic force to urge the wiper strip into close contact with the windshield, and the wiper frame having an inclined portion formed in an end thereof in which the coupling aperture is formed so the coupling aperture is slanted at a predetermined angle; and
   a connector coupled with the wiper frame,
   wherein the wiper strip is coupled with the wiper frame to be inclined with respect thereto and wherein the strip portion has a portion corresponding to the inclined portion of the wiper frame removed.

2. The wiper blade as claimed in claim 1, wherein the connector has an inclined coupling structure in which lengths of front and rear portions of one of a connecting rod portion or an assembling portion differ from each other to couple the wiper strip to a wiper arm perpendicularly to the windshield.

3. The wiper blade as claimed in claim 1 or 2, wherein the wiper frame includes two or more coupling slits, each coupling slit having a coupling aperture formed in one end thereof.

4. The wiper blade as claimed in claim 1, wherein the inclined portion at the end of the wiper frame has an inclination angle in a range of 5 to 35 degrees.

5. The wiper blade as claimed in claim 1 or 2, wherein the wiper frame comprises recesses formed in both sides of the coupling slit, and the wiper strip comprises protrusions corresponding to the recesses when the wiper strip is coupled with the wiper frame.

6. The wiper blade as claimed in claim 1, wherein the wiper frame comprises a through portion formed in front and rear sides with respect to the coupling slit and connected with the coupling slit, and an arch-shaped rib formed over the through portion and connecting both the sides of the wiper frame.

7. The wiper blade as claimed in claim 1, wherein the wiper strip is formed corresponding to the coupling slit.

8. The wiper blade as claimed in claim 1, wherein the wiper frame comprises an auxiliary coupling slit connected with the coupling aperture.

9. The wiper blade as claimed in claim 1, wherein front and rear portions of the wiper frame with respect to the coupling slit are symmetric in shape.

10. The wiper blade as claimed in claim 1, wherein the connector is coupled to the wiper frame by any one of curling, riveting, welding or adhesion.

11. The wiper blade as claimed in claim 1, wherein protrusions are formed on both sides of a center of a lower portion of the connector, guides to which the wiper frame is fitted are respectively formed in both ends of the lower portion of the connector, and only the protrusions formed in both the sides of the center are curled, whereby the connector is combined with the wiper frame and the guides formed in both of the ends guide the wiper frame not to be shaken when the connector is coupled to the wiper frame.

12. The wiper blade as claimed in claim 10 or 11, wherein a fixing protrusion is formed on any one of a lower surface of the connector and an upper surface of the wiper frame, and a fixing hole corresponding to the fixing protrusion is formed in the other one.

13. The wiper blade as claimed in claim 12, wherein the fixing hole and the fixing protrusion fitted into the fixing hole are bonded to each other by welding when the connector and wiper frame are coupled with each other by curling or riveting.

14. The wiper blade as claimed in claim 1 or 2, wherein the connector has a lower surface curved with the same curvature as that of the wiper frame.

15. The wiper blade of claim 1, wherein a spoiler is integrally formed with the wiper frame to be inclined at a predetermined angle.

* * * * *